(12) United States Patent
Gunther

(10) Patent No.: US 7,497,681 B2
(45) Date of Patent: Mar. 3, 2009

(54) NEEDLE VALVE NOZZLE

(75) Inventor: Herbert Gunther, Allendorf (DE)

(73) Assignee: Gunther GmbH & Co., Metallverarbeitung, Frankenberg/Eder (DE)

( * ) Notice: Subject to any disclaimer, the term of this patent is extended or adjusted under 35 U.S.C. 154(b) by 229 days.

(21) Appl. No.: 10/546,446

(22) PCT Filed: Feb. 19, 2004

(86) PCT No.: PCT/EP2004/001607

§ 371 (c)(1),
(2), (4) Date: Jul. 14, 2006

(87) PCT Pub. No.: WO2004/073954

PCT Pub. Date: Sep. 2, 2004

(65) Prior Publication Data

US 2006/0251759 A1 Nov. 9, 2006

(30) Foreign Application Priority Data

Feb. 20, 2003 (DE) .............................. 203 02 845 U

(51) Int. Cl.
*B29C 45/23* (2006.01)
(52) U.S. Cl. ........................................ 425/564; 425/566
(58) Field of Classification Search .......... 425/562.563, 425/564.565, 566
See application file for complete search history.

(56) References Cited

U.S. PATENT DOCUMENTS 4,286,941 A 9/1981 Gellert
5,090,890 A 2/1992 Morita
6,832,909 B2 * 12/2004 Bazzo et al. ................. 425/549

FOREIGN PATENT DOCUMENTS

| DE | 3245571 | 6/1984 |
|---|---|---|
| DE | 3249486 | 6/1984 |
| DE | 3403603 | 8/1985 |
| DE | 4109122 | 7/1992 |
| DE | 19717381 | 11/1997 |
| EP | 638407 | 2/1995 |
| EP | 873841 | 10/1998 |
| JP | 7186203 | 7/1995 |
| JP | 8090598 | 4/1996 |

* cited by examiner

*Primary Examiner*—Tim Heitbrink
(74) *Attorney, Agent, or Firm*—Clark & Brody

(57) ABSTRACT

A needle valve nozzle for an injection mould has a nozzle body with at least one melt channel that terminates in a nozzle mouthpiece and a fluidic connection to a mould cavity formed by a mould insert. A shut-off needle penetrates the melt channel and nozzle mouthpiece and can be displaced between open and closed positions. At least one infeed cone is provided upstream of a seal seat to centre the shut-off needle, the lower end of which forms a shut-off part. The nozzle mouthpiece consists of a material with high thermal conductivity, with the infeed cone configured in a centering body consisting of wear-resistant material and running concentrically with the longitudinal axis of the needle valve nozzle. The entering body is held against and/or in the nozzle mouthpiece in a positive-fit and its end section forming an outlet for the melt can be engaged with the mould insert.

17 Claims, 2 Drawing Sheets

NEEDLE VALVE NOZZLE

FIELD OF THE INVENTION

The invention relates to a needle valve nozzle for an injection mould.

BACKGROUND OF THE INVENTION

Needle valve nozzles are used in injection moulds for supplying a flowable melt at a pre-determinable temperature at high pressure to a separable mould block (mould insert). The shut-off needles, in general pneumatically or hydraulically actuated, are designed to periodically open and close outlet openings for the melt, for example when a plastic material is to be injected in a segmental manner (cascade moulding).

Each shut-off needle is arranged in the mould-side area of the needle valve nozzle in an axially displaceable manner, and in the nozzle-side area centrically running through a melt channel (see DE 32 49 486 C3 or DE 34 03 603 A1, for example). Typically, the melt channel terminates in a nozzle mouth piece which forms on its end the outlet opening for the melt. In closed position, the lower end of the shut-off needle which has a generally cylindrical section engages into a likewise cylindrical sealing seat which is formed in the nozzle mouthpiece or in the mould insert.

In order to be able to maintain the melt at a constant temperature on its way through the tempered melt channel to the mould insert, the nozzle mouthpiece typically consists of a highly thermally conductive material. It is directly screwed into the nozzle body of the needle valve nozzle from the bottom side or, as provided in DE 197 17 381 A1, firmly secured by means of an outer screw socket made from a material of low thermal conductivity. The outer end of the screw socket engages into a corresponding cylindrical seat in the mould insert, thus centring the outlet opening with respect to the sealing seat. A narrow air gap formed between the highly thermally conductive nozzle mouthpiece and the mould insert provides the required thermal separation between the needle valve nozzle and the mould.

Due to the effects of extremely high pressures, for example far greater than 1,000 bar, a precise sealing in the closed position as well as an accurate needle guidance are essential. To this end, the nozzle mouthpiece is provided, above the outlet opening, with an infeed cone for the shut-off needle to allow the latter to centrically enter the sealing seat during closing. However, this presents the problem that the shut-off needles use to strike with their sealing edges the infeed cone in the nozzle mouthpiece. As a result, damages and in the long run leakages may occur. Precise sealing requires compliance with strict tolerance limits, in particular in the case of long nozzles and deep bores, and thus entails increased costs for manufacture and repair.

To avoid these drawbacks, the document DE 32 45 571 C2 provides a shut-off needle with a stepped lower end, such that a striking edge of increased diameter is formed ahead of the actual shut-off part of the needle. The axial length of the preferably cylindrical shut-off part, i.e. the axial distance between the front sealing edge of the shut-off part and the striking edge, is selected so as to provide an angle formed by a connection line from the sealing edge to the striking edge extending through connection points distributed on parallel diameters, which is greater than the cone angle of the feed hopper in the nozzle mouthpiece, in each case relative to the longitudinal axis of the melt channel. Thus the nozzle mouthpiece serves as a pre-centring body for the shut-off needle. In fact, whenever the shut-off needle is deflected from its central position during the closing procedure, only the striking edge will contact the infeed cone, whereas the sensitive sealing edge of the shut-off needle is introduced in a contactless manner into the nozzle mouthpiece.

To improve service life, DE 32 45 571 C2 further proposes a nozzle mouthpiece made from a wear-resistant material. Such materials, however, are poor thermal conductors and therefore impair the temperature distribution in the unheatable nozzle mouthpiece.

The same proposal is made in the document DE 41 09 122 C1, except that the wear-resistant nozzle mouthpiece is not screwed into the nozzle body but axially pressed against the latter by means of a tension ring which encloses the mouthpiece and is screwed onto the nozzle body. A further drawback is the lateral introduction of the shut-off needle into the melt channel which entails great constructional expense. Furthermore, the shut-off part of the needle is not flush with the nozzle mouthpiece and therefore produces objectionable gate marks.

BRIEF SUMMARY OF THE INVENTION

It is an object of the invention to overcome these and further drawbacks found in the prior art and to provide an improved needle valve nozzle realized with simple means in a cost-effective manner and ensuring a constantly accurate needle guidance and sealing. Also, impairments of the temperature distribution as well as damages on the shut-off part of the shut-off needles and/or the nozzle mouthpiece are to be avoided.

In a needle valve nozzle for an injection mould for producing injection moulded parts, comprising a nozzle body that contains at least one melt channel for a melt, said melt channel terminating at or in a nozzle mouthpiece and having a fluidic connection to a mould cavity of the injection mould that is composed of at least one mould insert, and comprising a shut-off needle which penetrates the melt channel and the nozzle mouthpiece in such a manner that it is longitudinally displaceable and suitable to be moved from an open position into a closed position, with said shut-off needle comprising or forming on its lower end a shut-off part which engages in closed position into a sealing seat, and with at least one infeed cone provided ahead of the sealing seat for centring the shut-off needle, the invention provides that the nozzle mouthpiece is made from a highly heat-conductive material and substantially continues the melt channel cylindrically, that the or each infeed cone for the shut-off needle is formed in a centring body made from a wear-resistant material which is mounted on and/or in the nozzle mouthpiece by positive fit and that an end section which forms an outlet opening for the melt is engageable with the mould insert.

The nozzle mouthpiece made from a highly heat-conductive material provides a good temperature distribution well into the gate area, and its simple geometry permits economical manufacture. It allows for an accurate processing, in particular from the gate side, and therefore contributes to reducing the production costs. The centring body is manufactured with high precision as a separate part. It causes the shut-off needle to enter the sealing seat in a constantly centrical manner, with the wear-resistant material ensuring a reliable needle guidance and sealing for a long time. If leakages should nevertheless occur or the centring body become worn, the latter can be quickly and easily replaced without the need to disassemble the needle valve nozzle or the nozzle mouthpiece. Since it is possible at all times to insert another centring body with a corresponding outlet opening into the nozzle mouthpiece, bigger or smaller shut-off needles may also be used without any problem. Another advantage of the solution according to the invention resides in the fact that the centring body provides the required thermal separation between the needle valve nozzle and the mould insert. This obviates any need for additional isolation or separation elements.

The centring body is formed concentrically with respect to the longitudinal axis of the needle valve nozzle and comes to rest against the nozzle mouthpiece with its front. So it immediately abuts the nozzle mouthpiece, extending the nozzle towards the mould cavity, with the shut-off needle being inserted into the sealing seat in a constantly concentrical manner relative to the longitudinal axis.

The centring body comprises a cylindrical collar portion in the area of which the infeed cone for the shut-off needle is formed. Introducing the centring body with this collar portion into the nozzle mouthpiece ensures a reliable guidance. This is particularly advantageous if the centring body is positioned in the nozzle mouthpiece in a longitudinally displaceable manner. The shut-off needle cannot get in contact with the highly thermally conductive material of the nozzle any longer. Any damages on the nozzle mouthpiece are efficiently avoided. The needle valve nozzle has an all-in-all long service life.

In order to align the needle valve nozzle with respect to the mould cavity, the centring body engages with its end section into a cylindrical or conical seat in the mould insert. The end section engages into the seat in a longitudinally displaceable manner. The centring seat is preferably concentrical with respect to the gate, i. e. the melt will pass into the mould cavity by easy flow without hinderance. Simultaneously, a constantly reliable sealing of the centring body in the mould insert is ensured.

The sealing seat for the shut-off part of the shut-off needle can be formed in the mould insert or in the end section of the centring body. Moreover, the end section of the centring body can confine a part of the mould cavity.

The shut-off needle can taper towards the shut-off part. On the one hand, this has positive effects on the flow conditions in the melt channel. On the other hand, the needle guidance is improved. Also contributing to these benefits is a conical and/or rounded transition from the needle portion of greater diameter to the shut-off part of smaller diameter.

In a further important embodiment of the invention, a striking edge is formed between the shut-off part and the needle portion of greater diameter whose diameter exceeds that of the needle shut-off part at its sealing edge. The axial distance between the sealing edge of the shut-off part and the striking edge is selected so as to provide an angle formed by a connection line from the sealing edge to the striking edge, which connection line extends through connection points distributed on parallel diameters, said angle being greater than the angle of the infeed cone in the centring body, each angle extending relative to the longitudinal axis of the needle valve nozzle. This ensures that the rather sensitive sealing edge of the shut-off needle is prevented from striking the centring body as it enters the latter. In fact, the shut-off part of the needle will remain contactless. The service life of the needle valve nozzle is further increased.

In another aspect of the invention, the difference between the angle of the connection line from the sealing edge to the striking edge and the angle of the infeed cone is greater than the greatest possible achievable deflection angle of the shut-off needle relative to the longitudinal axis of the needle valve nozzle before the striking edge of the shut-off needle gets in contact with the inner wall of the centring body. Thus the sealing edge of the shut-off needle is prevented from striking the centring body. This is efficiently prevented by the striking edge which may be rounded. In this way, the shut-off needle is allowed to glide with low friction into the centring body.

In order to prevent the build-up of undesired backpressure in the melt during the closing process, the infeed cone is formed by ribs, axial fillets or the like, which enclose the shut-off needle in a concentrical slideable manner. The melt which is necessarily displaced as the shut-off needle enters the outlet opening and the sealing seat, respectively, can easily escape into the melt channel, i. e. the material compression or the pressure increase generated during the closing process will automatically be compensated. Alternatively, the shut-off needle may comprise lateral bulges, flattenings, recesses, or similar, which likewise reduce the pressure.

BRIEF DESCRIPTION OF THE DRAWINGS

Further features, details and advantages will become apparent from the reading of the claims and from the following description of embodiments in connection with the drawings, wherein:

DETAILED DESCRIPTION OF THE INVENTION

Figure 1:
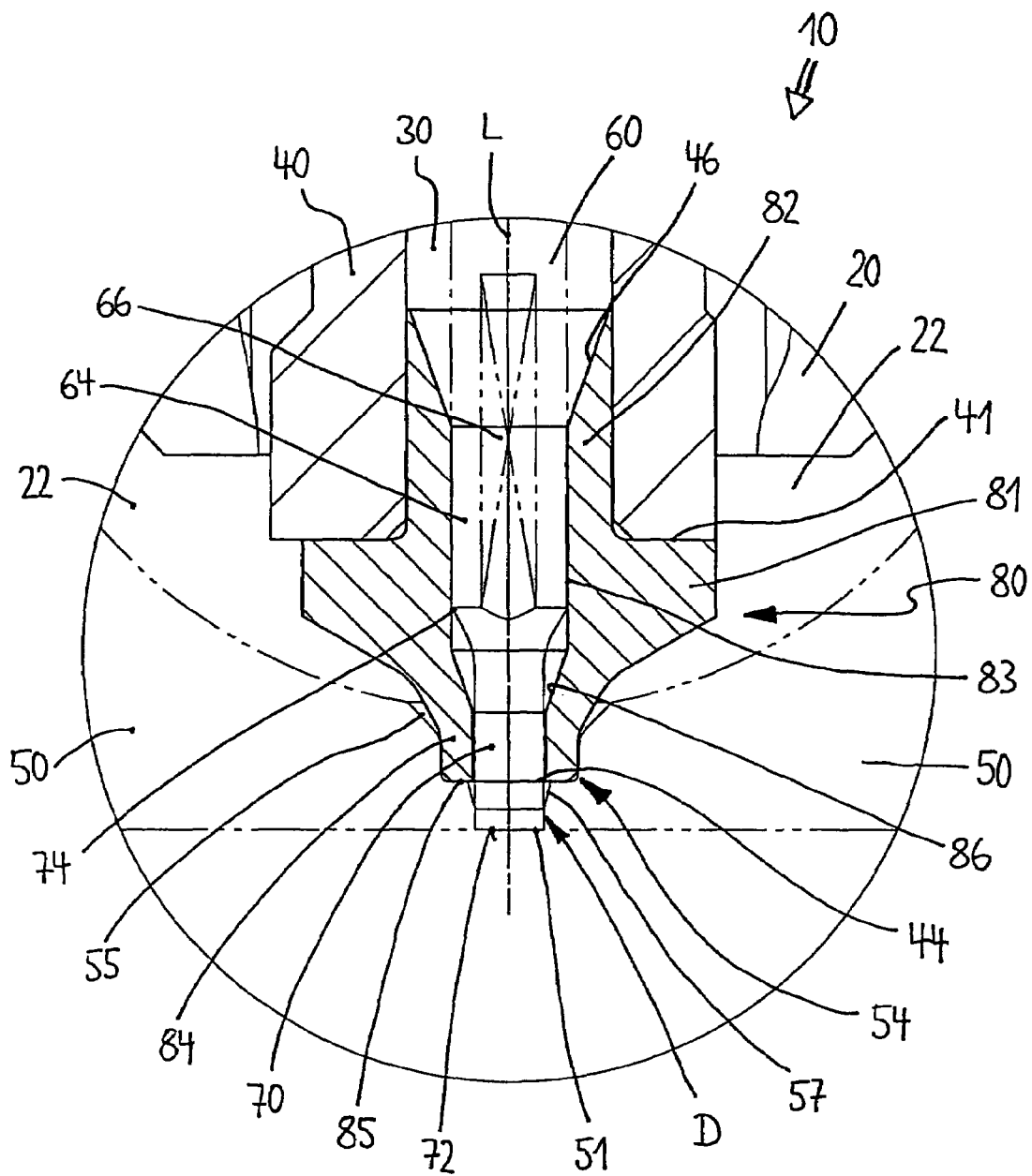
FIG. 1 is an enlarged axial sectional view of the lower end of a needle valve nozzle.

The needle valve nozzle, in FIG. 1 designated generally by the reference numeral 10, forms part of an injection mould (not shown in detail). It has a preferably externally heated nozzle body 20 in which a material duct (not shown) is formed which delimits a melt channel 30 concentrically with respect to the longitudinal axis L of the needle valve nozzle 10. A nozzle mouthpiece 40 made from a highly thermally conductive material is inserted, preferably screwed, from the bottom side into the nozzle body 20, with said nozzle mouthpiece 40 cylindrically continuing the melt channel 30 downwards without modification of the cross-section.

A melt, for example a metal, silicone or plastic melt, is supplied via the melt channel 30 into a mould cavity (not shown in detail) for processing. Said mould cavity is formed between at least two mould inserts 50 which are mounted on a moulding plate (not shown) and confine a gate 51 concentrically with respect to the longitudinal axis L of the hot runner nozzle 10.

A centring body 80 made from a wear-resistant material is arranged between the nozzle mouthpiece 40 and the mould inserts 50, said centring body 80 centring the needle valve nozzle 10 with respect to the gate 51 and forming together with the air chamber 22 which encloses the nozzle mouthpiece 40 and the nozzle body 20 a thermal separation between the needle valve nozzle 10 and the mould inserts 50, i. e. the highly heat-conductive nozzle mouthpiece 40 allows the flowable melt to be kept at a constantly high temperature on its way to the mould cavity. In addition, the centring body 80 prevents heating of the cool mould inserts 50.

As illustrated in FIG. 1, the centring body 80, which is all-in-all rotationally symmetrical with respect to the longitudinal axis L, comprises a broad flanged edge 81 and a narrow cylindrical collar portion 82. The latter is inserted into the melt channel 30 and in the nozzle mouthpiece 40, respectively, from the bottom side and reciprocates in them in longitudinal direction.

At its end facing the mould cavity, the centring body 80 forms a cylindrical end section 84 which engages in a longitudinally displaceable manner into a cylindrical seat 54. Said centring seat 54 formed by the mould inserts 50 is concentrical with respect to the gate 51 and may have a slightly conical form in an upper section 55 in order to facilitate the introduction of the centring body 80 with its end section 84 during assembly. Its outer diameter is selected so as to provide a pressure-tight connection and to prevent the melt from entering the air chamber 22. Simultaneously, longitudinal movements of the centring body 80 in the seat 54 are possible so that thermally induced changes in length of the needle valve nozzle 10 can be compensated, if necessary. The end face 85 of the end section 84 is preferably flat, just as the bottom surface (not specified) of the centring seat 54, so as to provide an accurate fit.

It will be noted that the melt channel 30 is continued through the centring body 80 whose end section 84 forms an outlet opening 44 for the melt. The centrical alignment of the hot runner nozzle 10 permits unhindered flow of the melt through the gate 51 into the mould cavity.

An axially displaceable shut-off valve 60 is provided for opening and closing the outlet opening 44. The shut-off valve 60 reciprocates in the melt channel 30 in longitudinal direction and can be moved by a pneumatic drive (not shown) from an open position into a closed position. The shut-off valve 60, which is at least sectionally cylindrical and comprises several stepped diameters along the longitudinal axis L, has at its end a shut-off part 70 designed to engage in closed position through the end section 84 of the centring body 80 into a sealing seat D. In the embodiment shown in FIG. 1, said sealing seat D is provided ahead of the gate 51 in the mould inserts 50 and is of tapered form in its upper portion 57 so as to allow the shut-off part 70, supported by the accumulated melt, to enter the sealing seat D in a low-friction manner.

The transitions from the needle portions of greater diameter to the sections having a smaller diameter may be conical or rounded, with a striking edge 74 being formed between a needle portion 64 and the abutting shut-off part 70 whose diameter exceeds that of the sealing edge 72 at the end of the shut-off part 70 of the shut-off needle 60.

In order to prevent damages on the sensitive shut-off part 70 and to keep the outlet opening 44 permanently pressure-tightly sealed, the striking edge 74 is designed to align the shut-off needle 60 by means of the centring body 80 in case that said shut-off needle 60 were deflected from its concentric position in the melt channel 30. To this end, an infeed cone 46 is provided in the collar portion 82 of the centring body 80, said infeed cone being concentric relative to the longitudinal axis L and continuing by a cylindrical guiding portion 83 whose inner diameter is insignificantly greater than the outer diameter of the needle portion 64 of the shut-off needle 60. A cone 86 which is formed ahead of the outlet opening 44 in the centring body 80 reduces the inner diameter of the guiding portion 83 to the diameter of the shut-off part 70 of the shut-off needle 60.

When moving from its open position into its closed position, the shut-off needle 60 is automatically aligned by the striking edge 74 and the infeed cone 46 so as to be concentric with respect to the longitudinal axis L, with the needle portion 64 being further advanced within the guidance section 83 of the centring body 80 without changing its alignment until the shut-off part 70 reaches the sealing seat D. The sensitive sealing edge 72 of the shut-off needle 60 is prevented from striking the nozzle mouthpiece 40 or the centring body 80. Damages to the shut-off needle 60 are thus avoided. Since the preferably slightly rounded striking edge 74 of the shut-off needle 60 is relatively insensitive, and the centring body 80 is made from a wear-resistant material, there is no problem in the case that the striking edge 74 gets in contact with the infeed cone 46.

In order to prevent the build-up of undesired backpressure in the melt during the closing process of the shut-off valve 60, the infeed cone 46 in the centring body 80 is formed by ribs, axial fillets (not specified) or the like, which enclose the shut-off needle 60 in a concentrically slideable manner. Additionally or alternatively, the shut-off needle 60 may be provided in the area of the needle portion 64 with lateral bulges or recesses 66 so as to allow the melt displaced by the shut-off needle 60 to freely flow back into the melt channel 30.

Figure 2:
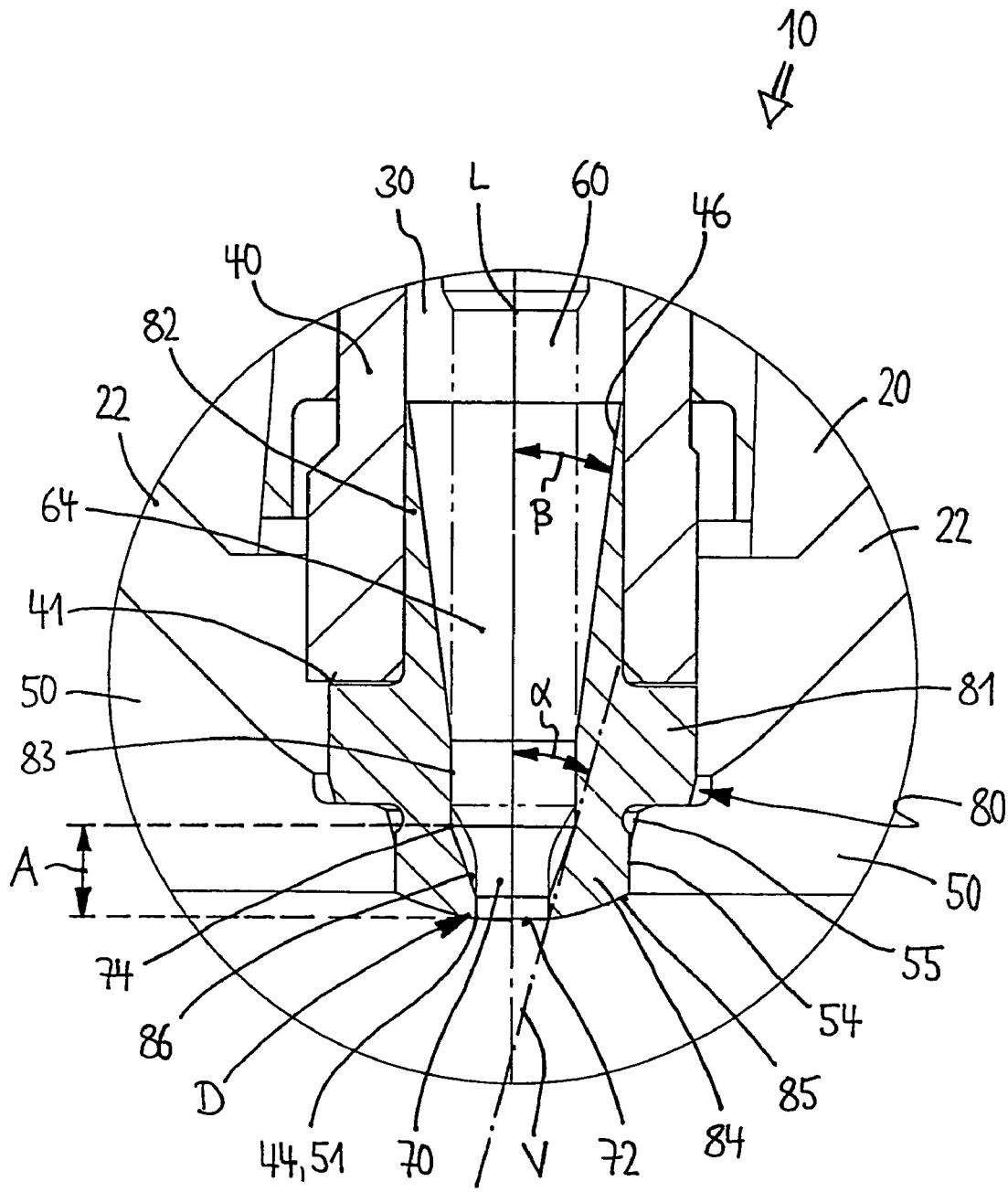
FIG. 2 is an enlarged axial sectional view of the lower end of another embodiment of a needle valve nozzle.

In the embodiment shown in FIG. 2, the end section 84 of the centring body 80, which is provided with a convex end face, confines a portion of the mould cavity. The centring seat 54 for the centring body 80 is still provided by the mould inserts 50, whereas the sealing seat D for the shut-off part 70 of the shut-off needle 60 is arranged in the end section 84 of the centring body 80. The outlet opening 44 and the gate 51 coincide with one another, i.e. the melt passes directly through the centring body 80 into the mould cavity.

It will be noted in FIG. 2 that the centring body 80 reciprocates in the nozzle mouthpiece 40 just as in the seat 54 of the mould inserts 50 in a longitudinal direction, so that a narrow motion-induced gap may form between the flanged edge 81 and the end face 41 of the nozzle mouthpiece 40. This ensures that the needle valve nozzle 10 can elongate when being heated without modifying the cavity boundary.

It is important to select the axial distance A between the sealing edge 72 of the shut-off part 70 and the striking edge 74 in such a manner that the angle α of a connection line V from the sealing edge 72 to the striking edge 74 which extends through connection points distributed on parallel diameters is greater than the cone angle β of the infeed cone 46 in the collar portion 82 of the centring body 80, each angle being relative to the longitudinal axis L of the hot runner nozzle 10. Thus the shut-off needle 60 is in any case stopped with its striking edge 74 on the infeed come 46 and guided through the guiding portion 83 so as to allow the shut-off part 70 to enter the sealing seat D in a contactless manner. Damages on the sealing edge 72 are almost completely precluded.

The invention is not limited to any of the embodiments described above, but includes many variations and modifications. For example, the centring body 80 is preferably made from a powder metallurgical material. It is conceivable, however, to use other materials having a high wear resistance. Depending on the particular embodiment, the flanged edge 81 of the centring body 80 may encompass or enclose the lower end of the nozzle mouthpiece 40. Furthermore, the shut-off needle 60 may be flush with the injection moulded part (not shown) or leave a mark on it. The embodiment shown in FIG. 2 allows in any case and at any time for easy replacement of the gate point if the centring body 80 is worn.

All features and advantages which become apparent from the claims, the description and the drawings, including design details, spatial arrangements and process steps, may be essential to the invention, both individually and in a great variety of combinations.

REFERENCES

α,β angles
A distance
D sealing seat
L longitudinal axis
V connection line
10 needle valve nozzle
20 nozzle body
22 air chamber
30 melt channel 40 nozzle mouthpiece
41 end face
44 outlet opening
46 infeed cone
50 mould insert
51 gate
54 centring seat
55 upper portion (centring seat)
57 upper area (sealing seat)
60 shut-off needle
64 needle portion
66 recess
70 shut-off part
72 sealing edge
74 striking edge
80 centring body
81 flanged edge
82 collar portion
83 guiding portion
84 end section
85 end face
86 cone

The invention claimed is:

1. Needle valve nozzle (10) for an injection mould for producing injection moulded parts, comprising a nozzle body (20) that contains at least one melt channel (30) for a melt, said melt channel (30) terminating at or in a nozzle mouthpiece (40) and having a fluidic connection to a mould cavity of the injection mould that is formed by at least one mould insert (50), and comprising a shut-off needle (60) which penetrates the melt channel (30) and the nozzle mouthpiece (40) in such a manner that it is longitudinally displaceable and suitable to be moved from an open position into a closed position, with said shut-off needle (60) comprising or forming on its lower end a shut-off part (70) which engages in closed position into a sealing seat (D), and with at least one infeed cone (46) provided ahead of the sealing seat (D) for centring the shut-off needle (60), characterised in that the nozzle mouthpiece (40) is made from a highly heat-conductive material and substantially continues the melt channel (30) cylindrically, wherein the or each infeed cone (46) for the shut-off needle (60) is formed in a centring body (80) made from a wear-resistant material, said cone being mounted on and/or in the nozzle mouthpiece (40) by positive fit and wherein an end section (84) of the centring body (80) which forms an outlet opening (44) for the melt is engageable with the mould insert (50).

2. Needle valve nozzle according to claim 1, characterised in that the centring body (80) is concentrical with respect to the longitudinal axis (L) of the needle valve nozzle (10) and comes to rest against the nozzle mouthpiece (40) with its front.

3. Needle valve nozzle according to claim 1, characterised in that the centring body (80) comprises a cylindrical collar portion (82) in the area of which the infeed cone (46) for the shut-off needle (60) is formed.

4. Needle valve nozzle according to claim 1, characterised in that the centring body (80) is positioned in the nozzle mouthpiece (40) in a longitudinally displaceable manner.

5. Needle valve nozzle according to claim 1, characterised in that the centring body (80) engages with its end section (84) into a cylindrical or conical seat (54) provided in the mould insert (50).

6. Needle valve nozzle according to claim 5, characterised in that the end section (84) of the centring body (80) engages into the seat (54) in a longitudinally displaceable manner.

7. Needle valve nozzle according to claim 1, characterised in that the sealing seat (D) for the shut-off part (70) of the shut-off needle (60) is formed in the mould insert (50).

8. Needle valve nozzle according to claim 1, characterised in that the sealing seat (D) for the shut-off part (70) of the shut-off needle (60) is formed in the end section (84) of the centring body (80).

9. Needle valve nozzle according to claim 8, characterised in that the end section (84) of the centring body (80) confines a part of the mould cavity.

10. Needle valve nozzle according to claim 1, characterised in that the shut-off needle (60) is tapered towards the shut-off part (70).

11. Needle valve nozzle according to claim 10, characterised in that the transition from the needle portion (64) of greater diameter to the shut-off part (70) of smaller diameter is conical and/or rounded.

12. Needle valve nozzle according to claim 11, characterised in that between the shut-off part (70) and the needle portion (64) of greater diameter, a striking edge (74) is formed whose diameter exceeds that of the needle shut-off part (70) at its sealing edge (72).

13. Needle valve nozzle according to claim 12, characterised in that the axial distance (A) between the sealing edge (72) of the shut-off part (70) and the striking edge (74) is selected so as to provide an angle ($\alpha$) formed by a connection line (V) from the sealing edge (72) to the striking edge (74) extending through connection points distributed on parallel diameters, which angle ($\alpha$) is greater than the angle ($\beta$) of the infeed cone (46) in the centring body (80), each angle being relative to the longitudinal axis (L) of the needle valve nozzle (10).

14. Needle valve nozzle according to claim 13, characterised in that before the striking edge (74) of the shut-off needle (60) contact the inner wall of the centring body (80) the difference between the angle ($\alpha$) and the angle ($\alpha$) is greater than the greatest possible achievable deflection angle of the shut-off needle (60) relative to the longitudinal axis (L) of the needle valve nozzle (10).

15. Needle valve nozzle according to claim 12, characterised in that the striking edge (74) is rounded.

16. Needle valve nozzle according to claim 1, characterised in that the infeed cone (46) is formed by ribs, fillets or the like, which enclose the shut-off needle (60) in a concentrically slideable manner.

17. Needle valve nozzle according to claim 1, characterised in that the shut-off needle (60) comprises lateral bulges, flattenings, recesses (66) or similar.

* * * * *